United States Patent
Yokota et al.

(10) Patent No.: US 9,381,721 B2
(45) Date of Patent: Jul. 5, 2016

(54) GASKET MATERIAL

(75) Inventors: Atsushi Yokota, Kanagawa (JP); Isao Watanabe, Kanagawa (JP); Taichi Kano, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 14/131,789

(22) PCT Filed: Jul. 12, 2012

(86) PCT No.: PCT/JP2012/067829
§ 371 (c)(1),
(2), (4) Date: Jan. 9, 2014

(87) PCT Pub. No.: WO2013/011918
PCT Pub. Date: Jan. 24, 2013

(65) Prior Publication Data
US 2014/0154497 A1    Jun. 5, 2014

(30) Foreign Application Priority Data

Jul. 19, 2011    (JP) .................................. 2011-158456

(51) Int. Cl.
| | | |
|---|---|---|
| *B32B 15/04* | (2006.01) | |
| *F16J 15/10* | (2006.01) | |
| *C08J 9/00* | (2006.01) | |
| *C08J 9/32* | (2006.01) | |
| *C09K 3/10* | (2006.01) | |
| *B32B 7/12* | (2006.01) | |
| *B32B 15/06* | (2006.01) | |
| *B32B 15/18* | (2006.01) | |

(52) U.S. Cl.
CPC ................. *B32B 15/046* (2013.01); *B32B 7/12* (2013.01); *B32B 15/06* (2013.01); *B32B 15/18* (2013.01); *C08J 9/0066* (2013.01); *C08J 9/32* (2013.01); *C09K 3/1006* (2013.01); *F16J 15/102* (2013.01); *B32B 2255/06* (2013.01); *B32B 2255/205* (2013.01); *B32B 2266/0207* (2013.01); *B32B 2266/08* (2013.01); *B32B 2307/536* (2013.01); *B32B 2307/714* (2013.01); *B32B 2581/00* (2013.01); *C08J 2201/026* (2013.01); *C08J 2203/22* (2013.01); *C08J 2205/044* (2013.01); *C08J 2205/052* (2013.01); *C08J 2205/06* (2013.01); *C08J 2309/02* (2013.01); *C08J 2313/00* (2013.01); *C08J 2409/02* (2013.01); *C08J 2413/00* (2013.01); *C09K 2200/0612* (2013.01); *Y10T 428/249976* (2015.04)

(58) Field of Classification Search
CPC .... B32B 15/046; B32B 7/12; B32B 2250/40; B32B 2266/0207; B32B 2266/0271; B32B 2266/08; B32B 2581/00
See application file for complete search history.

(56) References Cited

U.S. PATENT DOCUMENTS

| | | | | |
|---|---|---|---|---|
| 2005/0131156 | A1* | 6/2005 | Sawada et al. ................ | 525/233 |
| 2005/0276984 | A1* | 12/2005 | Kagehisa et al. ............. | 428/418 |
| 2010/0168302 | A1* | 7/2010 | Nagamori et al. ............ | 524/186 |
| 2011/0089646 | A1* | 4/2011 | Omura et al. ................. | 277/654 |

FOREIGN PATENT DOCUMENTS

| | | |
|---|---|---|
| JP | 5048742 | 2/1993 |
| JP | 7286165 | 10/1995 |
| JP | 2005315418 | 11/2005 |
| JP | 2011099558 | 5/2011 |

* cited by examiner

*Primary Examiner* — Hai Vo
(74) *Attorney, Agent, or Firm* — K. David Crockett, Esq.; Niky Economy Syrengelas, Esq.; Crockett & Crockett, PC

(57) ABSTRACT

The purpose of the present invention is to provide a gasket material that is capable of preventing corrosion caused by sulfur element, can be used as a seal part for a product that is easily damaged by corrosion, such as an electronic part, and is capable of forming a tight seal under low surface pressure with a material having low rigidity and inadequate reliability such as to have a blowhole, and that can prevent reduction in bolt axial load without producing plastic flow (setting) under pressure. The purpose is achieved by a gasket material in which a foamed rubber layer having a closed cell structure is formed, via an adhesive layer, on at least one side of a metal plate, wherein the foamed rubber layer comprises a carboxyl group-modified nitrile rubber, the expansion ratio of the foamed rubber layer is 2.0 to 3.0, and the foamed rubber layer is crosslinked with an epoxy compound.

5 Claims, No Drawings

GASKET MATERIAL

FIELD OF THE INVENTION

The present invention relates to a gasket material, in particular to a gasket material in which a foamed rubber layer is formed on at least one side of a metal plate.

DESCRIPTION OF THE RELATED ART

Metal gaskets in which an unfoamed rubber layer is laminated, as gaskets to be mounted on such as a vehicle engine, are known. Such metal gaskets achieve an excellent sealing property when used together with a bead and when a surface roughness of an opposite material is generally 12.5 Ra or lower. However, the sealing property is not ensured in some cases if the surface roughness is higher than 12.5 Ra and if there is a blowhole across a bead line, since the metal gaskets are sealed by concentrating a bolt load on a bead portion (embossed portion).

In contrast with these metal gaskets with a laminated unfoamed rubber layer, metal gaskets with a laminated foamed rubber layer are also known (cited patent document 1).

These metal gaskets with a laminated foamed rubber layer are capable of sealing an opposite material having a high surface roughness, and a blowhole. However, foaming generally requires a thickness of a rubber layer before foaming of about 70 μm or more, in particular when the desired expansion ratio is 2 or more.

Such a thick rubber layer before foaming leads to crushing of foamed rubber layer under high temperature and high pressure, and thus reduced axial loads of bolts in metal gaskets with a laminated foamed rubber layer.

Methods to prepare a foamed rubber layer generally include microcapsule method and heat decomposition method using a chemical foaming agent. A foamed rubber layer prepared by microcapsule method has many problems. Its small expansion ratio has a small effect on sealing blowholes. Forming mainly closed cells (independent cells) in a foamed rubber layer leads to shrinkage of each of closed cells at a lower temperature (lower than 0° C.), and thus reduced axial loads of bolts. When a sealing surface pressure is low, imperfect crushing of the foamed rubber layer leads to deterioration of properties and functions of the foamed rubber layer during use, and thus stress relaxation of axial loads of bolts.

In order to solve these problems, cited patent document 2 provides a gasket material to form a gasket to be mounted on a vehicle engine in which a foamed rubber layer on both sides or a side of a steel plate, and a thickness of the rubber layer before foaming is 15 to 50 μm and its expansion ratio is 2 to 4. By using the gasket material, obtained is a gasket which is free from plastic flow (setting) of the rubber under high temperature and high pressure and shrinkage of the rubber layer at a lower temperature, and thus capable of sealing a flange with a blowhole and a high surface roughness properly.

On the other hand, a gasket material having a foamed rubber layer formed, via an adhesive layer, on at least one side of a metal plate has a strong compression recovery property due to the foamed rubber layer with closed cells or open cells, therefore has a major advantage that a gasket with good sealability can be obtained by simply punching out to a predetermined shape not requiring emboss processing and the like to give sealing properties.

However, its insufficient physical properties such as small tensile strength and large stress relaxation of the foamed rubber layer leads to blow-by under high pressure.

In addition, conventional foamed rubber layers have drawbacks that their large expanding cell diameters and mixed existence of closed cells and open cells lead to permeation of fluids through the open cells and large stress relaxation, and thus deterioration of sealing properties under low surface pressure.

In order to solve these problems, cited patent document 3 provides a gasket material in which a foamed rubber layer is formed by thermal expansion of a low-boiling point hydrocarbon expansion agent in microcapsule-like particles.

In industry fields including vehicle industry of recent years, highly advanced computerization generally leads to requirement of heat resistance and oil resistance as well as low corrosion in electronic circuits from sealing materials.

However, rubbers used in cited patent documents 2 and 3 described above are common rubbers vulcanized by sulfur, therefore these gasket materials are not suitable for products such as electronic parts which are easily damaged by corrosion.

In contrast with these rubbers vulcanized by sulfur, cited patent document 4 tries to remove (improve) corrosion by using a quinoid-based crosslinking agent.

However, large compression set and embrittling due to air heat aging of the gasket material in cited patent document 4 preclude using in applications including vehicles where high temperatures are expected.

CITED DOCUMENTS

Patent Documents

Patent Document 1: JP-A-5-048742;
Patent Document 2: JP-A-2005-315418;
Patent Document 3: JP-A-7-286165;
Patent Document 4: JP-A-2011-99558;

SUMMARY OF THE INVENTION

Problems to be Solved by the Invention

In industry fields including vehicle industry of recent years, highly advanced computerization leads to requirement of heat resistance and oil resistance as well as low corrosion in electronic circuits from sealing materials. Also, advanced weight saving and reducing the cost of opposite materials lead to requirement of further prevention of reduced axial loads of bolts, because materials having low rigidity and inadequate reliability such as to have not only a blowhole but also surface waviness must be sealed.

In addition, unpressurized oven vulcanization, not pressurized vulcanization such as press vulcanization, must be adopted to form a foamed rubber layer. And a vulcanizing agent including sulfur element cannot be used because low corrosion in electronic circuits is required from gasket materials.

A problem of the present invention is to provide a gasket material that is capable of preventing corrosion by sulfur element and can be used as a seal part of a product which is easily damaged by corrosion, such as an electronic part, and is capable of forming a tight seal under low surface pressure with a material having low rigidity and inadequate reliability such as to have a blowhole, and is capable of preventing reduction in axial loads of bolts without producing plastic flow (setting) under pressure.

Other problems of the present invention are indicated in the following description.

Means for Solving the Problems

Problems described above are solved by each of following inventions.

1. A gasket material in which a foamed rubber layer having a closed cell structure is formed, via an adhesive layer, on at least one side of a metal plate, wherein the foamed rubber layer comprises a carboxyl group-modified nitrile rubber, the expansion ratio of the foamed rubber layer is 2.0 to 3.0, and the foamed rubber layer is crosslinked with an epoxy compound.

2. The gasket material according to 1, wherein the foamed rubber layer further comprises 2-ethyl-4-methylimidazole as a crosslinking accelerator.

3. The gasket material according to 1 or 2 used in an electronic circuit and the like.

Advantages of the Invention

According to the present invention, provided is a gasket material that is capable of preventing corrosion by sulfur element and can be used as a seal part of a product which is easily damaged by corrosion, such as an electronic part, is capable of forming a tight seal under low surface pressure with a material having low rigidity and inadequate reliability such as to have a blowhole, and is capable of preventing reduction in axial loads of bolts without producing plastic flow (setting) under pressure.

DESCRIPTION OF PREFERRED EMBODIMENTS

Preferred embodiments of the present invention are explained as follows.

<Foaming Rubber Layer>

[Carboxyl Group-Modified Nitrile Rubber]

At least a rubber composition polymer used in a foaming rubber layer composition of the present invention is a nitrile rubber polymer, in particular a carboxyl group-modified nitrile rubber (also referred to as a carboxyl group-modified nitrile rubber polymer in the present invention), and is preferably a carboxyl group-modified acrylonitrile-butadiene copolymer rubber.

Carboxyl group-modified nitrile rubbers with various monomer ratios may be used, and a part of butadiene component may be hydrogenated.

Linked acrylonitrile contents of carboxyl group-modified acrylonitrile-butadiene copolymer rubbers are preferably in the range of 18 to 48%, and more preferably 31 to 42%. A content of smaller than 18% leads to poor adherence to the adhesive, and a content larger than 48% leads to poor cold resistance. Mooney viscosities, ML1+4 (100° C.), of carboxyl group-modified acrylonitrile-butadiene copolymer rubbers are preferably in the range of 30 to 85, and more preferably 35 to 70. A Mooney viscosity smaller than 30 leads to large plastic flow (setting) under pressure.

In the present invention, a carboxyl group-modified nitrile rubber may be used alone or in combination with a compatible polymer such as an acrylonitrile-butadiene rubber (NBR), a liquid acrylonitrile-butadiene rubber, a hydrogenated acrylonitrile-butadiene rubber (HNBR), and a styrene-butadiene rubber.

Carboxyl group-modified nitrile rubbers used in the present invention are commercially available. For example, commercial products such as "KRYNAC X7.50", "KRYNAC X7.40", "KRYNAC X1.46", "KRYNAC X1.60", "KRYNAC X9.50", and "KRYNAC 221" (described above are manufactured by Polysar/Bayer Corporation), "Nipol NX775", "Nipol 1072", "Nipol DN631", and "Nipol DN601" (described above are manufactured by Zeon Corporation), and "N632S" (manufactured by JSR Corporation) may be used.

In the present invention, a foaming rubber composition is prepared by mixing a carboxyl group-modified nitrile rubber with a vulcanizing agent and a foaming agent, and preferably a vulcanizing accelerator, a carbon black, an inorganic filler, a zinc oxide such as active zinc oxide, an antiaging agent, a plasticizer, and others.

[Vulcanizing Agent, Vulcanizing Accelerator]

In the present invention, at least a epoxy compound is used as a vulcanizing agent. As the epoxy compound, thermosetting liquid or solid synthetic resins having two or more reactive epoxy groups are used. Common epoxy resins such as bisphenol A-type epoxy resins and bisphenol F-type resins, as well as phenoxy resins, biphenyl resins, and alkyl glycidyl ethers may be use alone or in combination.

In addition, in the present invention, at least a vulcanizing accelerator is preferably mixed. By concurrently using such as dicyandiamide, 2-ethyl-4-methylimidazole, and hexamethylenetetramine, as a preferable vulcanizing accelerator, alone or in combination, vulcanization rate may be increased. Among them, 2-ethyl-4-methylimidazole is preferable from the point of vulcanization accelerating capacity.

[Foaming Agent]

As the foaming agent, organic or inorganic foaming agents, or thermally expandable microcapsules in which a low-boiling point hydrocarbon expansion agent is encapsulated, and the like may be used. Among them, microcapsules are preferable since they easily form closed cell structure.

Preferable examples of microcapsule-type foaming agents that can make the expanded cell diameter 25 µm or more in the foamed rubber layer of the gasket material of the present invention include, for example, microcapsules in which an organic solvent such as isopentane is encapsulated by a thermoplastic resin such as polyacrylonitrile (PAN) resins. They are commercially available.

Microcapsules with shell materials of thermosetting resins are preferable because they elevate durability of closed cell structure under pressure.

In the present invention, cell diameter means the diameter when the foamed cell is spherical, and the sphere-converted diameter when the foamed cell is not spherical.

In order to obtain a suitable foamed rubber layer for the gasket material of the present invention, expansion ratio of the closed cell structure is 2.0 to 3.0, preferably 2.3 to 2.8. A ratio of less than 2.0 leads to reduced manufacturing rate in continuous line and thus poor productivity and to deteriorated sealing property against a blowhole under low surface pressure. In contrast, a ratio of more than 3.0 leads to reduced occupied volume of the rubber and thus easily occurrence of plastic flow (setting) under pressure and reduction in axial loads of bolts.

The mixing amount of the foaming agent to achieve the preferable expansion ratio is preferably 5 to 10 parts by weight per 100 parts by weight of the carboxyl group-modified nitrile rubber polymer, more preferably 6 to 9 parts by weight.

Commercially available forming agents include "Miceosphere F100D" (manufactured by Matsumoto Yushi-Seiyaku Co., Ltd.) and the like.

[Carbon Black]

As carbon black, furnace black and thermal black with high reinforcement are used. Thermal black is particularly preferable because it elevates reinforcement as well improves gum applicability. Furnace black and thermal black may be used alone or in combination.

The mixing amount of the carbon black is preferably 5 to 120 parts by weight per 100 parts by weight of the carboxyl group-modified nitrile rubber polymer of the present invention, more preferably 10 to 100 parts by weight. A mixing amount of smaller than 5 parts by weight leads to deterioration of kneadability and thus reduced productivity. A mixing amount of larger than 120 parts by weight leads to high rubber hardness degree and thus loss of rubber elasticity.

In addition to components described above, other necessary compounding agents are properly mixed in the foaming rubber layer composition of the present invention.

[Inorganic Filler]

Inorganic filler may be used in combination with carbon black or instead of carbon black.

Inorganic filler includes silica, basic magnesium carbonate, activated calcium carbonate, specified calcium carbonate, super fine magnesium silicate, hard clay, barium sulfate, talc, graphite, mica, kaolin, calcium silicate, wollastonite, and the like. They may be used alone or in combination.

Addition of these inorganic fillers is effective for prevention of peeling of the adhesive layer during immersion at high temperature, and improves water resistance.

In case of silica, natural silica having mean particle size of about 20 µm or less is preferable. Surface treated natural silica with such as silane coupling agents are more preferable because it shows higher effects.

The mixing amount of the inorganic filler is preferably 5 to 120 parts by weight per 100 parts by weight of the carboxyl group-modified nitrile rubber polymer of the present invention, more preferably 10 to 100 parts by weight. A mixing amount of smaller than 5 parts by weight leads to poor adherence. In contrast, a mixing amount of larger than 120 parts by weight leads to high rubber hardness degree and thus loss of rubber elasticity.

In addition, compounding agents that are commonly used in rubber industry including plasticizers, stearic acid, processing aids such as paraffin, zinc oxide, and magnesium oxide are properly mixed.

[Antiaging Agent]

As an antiaging agent, common commercial products such as imidazole and thiourea may be used.

However, when the gasket material of the present invention is used near an electronic part, antiaging agents that do not contain sulfur atom, for example, p-phenylenediamine-based antiaging agents are preferable. P-phenylenediamine-based antiaging agents include N-isopropyl-N'-phenyl-p-phenylenediamine (IPPD), N-1,3-dimethylbutyl-N'-phenyl-p-phenylenediamine (6PPD), N-(1-methylheptyl)-N'-phenyl-p-phenylenediamine (8PPD). Commercial products include "Antigen 3C", "Antigen 6C" (described above are manufactured by Sumitomo Chemical Co., Ltd.).

[Kneading]

Raw materials for the foaming rubber composition described above are kneaded with a kneading apparatus such as a intermixture, a kneader, a Banbury mixer, or an open roll, and the like. Rubber compound is prepared, after kneading, by dissolving or mixing into solvents with a boiling point of 250° C. or lower, for example, aromatic hydrocarbons such as toluene, ketones such as methyl ethyl ketone and methyl isobutyl ketone, or mixed solvents of them so that a coating solution has a solid content concentration of 25 to 50%.

[Gasket Material]

A gasket material of the present invention is prepared by laminating the foaming rubber layer described above, via a primer layer when necessary and an adhesive layer, on one side or both sides of a metal plate.

The metal plate is not particularly limited, and metal plates such as stainless steel plates (ferritic stainless steel, martensitic stainless steel, and austenitic stainless steel), cold-reduced steel plates (SPCC), or aluminum-coated steel plates may be used.

Also, metal plates whose surface is roughened by shot blast, scotch blast, hairline finishing, or dull finishing may be used.

Preferably, a primer layer is formed on these metal plates. Forming a primer layer is particularly preferable when a rubber-metal composite is used as a gasket material because the primer layer largely elevates thermal resistance and water resistance due to rubber adhesion in the rubber-metal composite.

As the primer layer, a film of zinc phosphate, a film of iron phosphate, a chromate film, an inorganic film of metal compounds of such as vanadium, zirconium, titanium, molybdenum, tungsten, zinc, and cerium, particularly oxides of these metals, an organic film of such as silanes, phenol resins, epoxy resins, polyurethanes may be used.

A metal plate, after degreasing with such as alkali degreasing, in which an anti-rust film is formed by chromate-based rustproofing or nonchromate-based rustproofing is preferably used. In a case of a cold-reduced steel plate (SPCC), a film of zinc phosphate, iron phosphate, or the like may be formed.

The thickness of the metal plate is preferably about 0.1 to 1 mm, more preferably about 0.2 to 0.8 mm.

An adhesive is prepared by dissolving an adhesive resin, a crosslinking agent, and a crosslinking accelerator or an unvulcanized adhesive rubber composition into an organic solvent with the common technique. The adhesive solution is applied to the metal plate, and an adhesive layer is formed.

As the adhesive resin, one kind or a combination of two kinds or more of resins selected from phenol resins, epoxy resins, and xylene resins is preferably used.

Phenol resins include all types of thermosetting phenol resins such as cresol novolac-type phenol resins, cresol resol-type phenol resins, and alkyl-modified phenol resins.

Epoxy resins generally include cresol novolac-modified epoxy resins. As their hardening agents, bisphenol novolac-type phenol resins, and as their hardening catalysts, imidazol compounds are suitably used.

Xylene resins include all types of xylene resins such as phenol-modified xylene resins.

As crosslinking agents for adhesives, such as hexamethylenetetramine, and as crosslinking accelerators, such as 2-ethyl-4-methylimidazole are preferably used.

As the adhesive rubber composition, rubber compositions of NBR or HNBR are used. It may comprise NBR, HNBR, or carboxyl group-modified NBR with acrylonitrile content of 18 to 48%, carbon black, an inorganic filler, zinc oxide, a crosslinking agent, a crosslinking accelerator, or a crosslinking coagent comprising an organic peroxide or sulfur.

However, a crosslinking agent, a crosslinking accelerator, or a crosslinking coagent that does not contain a sulfur atom are used in the present invention so that a gasket material suitably used near an electronic part is prepared.

When a SUS plate is used, organosilane compounds such as alkoxysilanes comprising at least an amino group or alkoxysilanes comprising at least a vinyl group may be used. The alkoxysilanes comprising at least an amino group include, for example, γ-aminopropyltriethoxysilane, γ-aminopropyltrimethoxysilane, N-β-(aminoethyl)-γ-aminopropyltrimethoxysilane, and N-β-(aminoethyl)-γ-aminopropyltriethoxysilane. The alkoxysilanes comprising at least a vinyl group include, for example, vinyltrimethoxysilane and vinyltriethoxysilane. They may be used alone or in combination.

Any organic solvent may be used so long as it can simultaneously dissolve an adhesive resin, a crosslinking agent, and a crosslinking accelerator or an unvulcanized adhesive rubber composition. It includes, for example, aromatic hydrocarbons such as toluene, ketones such as metyl ethyl ketone and methyl isobutyl ketone, alcohols such as isopropyl alcohol, or mixed solvents of them.

In this way, an adhesive solution is prepared with a solvent so that it has a solid content concentration of 0.5 to 20%, and is applied on a metal plate, preferably on a metal plate with a primer layer formed. Then, applied adhesive layer is air dried at room temperature, dried at about 100 to 250° C. for about 5 to 30 minutes (may be crosslinked), and finished.

The adhesive layer may have a single layer or multi-layers. For example, a phenol-based adhesive layer is formed on the primer layer, and a phenol-based adhesive layer comprising an NBR composition described above may be formed on it. Such a structure has stronger adherence to the primer layer and a foaming layer, although has increased application operations.

The coating solution of the foaming rubber composition is coated on the adhesive layer, vulcanized in an oven, and a foamed rubber layer is formed.

As the coating method, roll coating, die coating, knife coating, as well as partial coating by screen printing, dispensing, and ink jet dispensing may be used. The coating solution is prepared to have a viscosity suitable for the coating method. For example, in a case of roll coating, preferable viscosity is 2,000 to 5,000 mPa$\Sigma$s. In a case of screen printing, preferable viscosity is 5,000 to 30,000 mPa$\Sigma$s, and an organic solvent having a high boiling point and being not easily volatile is preferably used. In all cases, the solid content concentration is adjusted depending on room temperature and the solution temperature.

The coating solution is coated so that the thickness after drying becomes 40 to 90 μm, preferably 50 to 75 μm, and vulcanized preferably at 150 to 250° C. for 10 seconds to 10 minutes without pressure.

A solid mold releasing agent such as paraffin wax, graphite, polyethylene, PTFE, and cellulose fiber may be further laminated via a binder in order to prevent tack of the surface of the rubber after vulcanization when necessary.

Thus obtained rubber-metal laminate (gasket material) is formed into a desired shape, for example by punching out, and suitably used as a gasket.

EXAMPLES

Examples of the present invention are shown as follows, but the present invention is not limited by the Examples.

Example 1 carboxyl group-modified NBR polymer ("Nipol NX775", carboxyl group content, 0.083 EPHR (equivalents per hundred rubber), manufactured by Zeon Corporation)
100 parts by weight
MT carbon black ("Thermax N990", manufactured by Cancarb Limited)
20 parts by weight
stearic acid (Manufactured by Miyoshi Oil & Fat Co., Ltd.)
2 parts by weight
antiaging agent ("Antigen 3C", manufactured by Sumitomo Chemical Co., Ltd.)
3 parts by weight
thermally expandable microcapsule foaming agent ("Microsphere F100D, manufactured by Matsumoto Yushi-Seiyaku Co., Ltd.)
7.5 parts by weight
plasticizer (diisodecyl adipate (DIDA), "Sansocizer DIDA", manufactured by New Japan Chemical Co., Ltd.)
8 parts by weight
crosslinking agent ("JER828", manufactured by Japan Epoxy Resin K.K.)
10 parts by weight
Components described above were kneaded with an open roll into rubber compound.

The rubber compound was dissolved into a mixed solvent of toluene:methyl ethyl ketone=9:1, and a coating solution with a solid content concentration of 25 weight % was prepared.

Next, an adhesive layer was formed on a metal plate (SPCC) with an aricorrosion film, then the coating solution was applied so that the thickness of the rubber compound became 150 μm, vulcanized in an oven at 210° C. for 3 minutes with heated air, and a gasket material was obtained. Then it was evaluated as follows.

<Evaluation>

(1) Vulcanization rate of the obtained rubber compound was evaluated as follows.

[Vulcanization rate] (according to JIS K6300-2 (2001) being equivalent to ISO 6502 (1999))

Vulcanization rate was measured with a rotor-less rheometer and evaluated according to the following criteria: t 90 or more of vulcanization degree at 200° C. for less than 3 minutes was rated as "○", t 90 or more of vulcanization degree at 200° C. for 3 minutes or more and less than 10 minutes was rated as "Δ", and t 90 or more of vulcanization degree at 200° C. for 10 minutes or more or no vulcanization was rated as "x".

(2) Following properties of the obtained rubber compound was evaluated as follows.

[Expansion Ratio]

As described above, a gasket material was prepared. Expansion ratio was calculated from thicknesses before and after foaming at 200° C. for 3 minutes. That is, if the thickness is 65 μm before foaming, and 150 μm after foaming, the expansion ratio is 2.3.

[Metal Corrosiveness]

An indicative silver plate and a copper plate (each has width of 15 mm, length of 15 mm, and thickness of 1 mm), and a gasket material sample were put into a glass vessel, then the vessel was hermetically sealed. The glass vessel was left at room temperature for 3 months, then the indicative plates were checked whether they discolored or not. Metal corrosiveness was evaluated according to the following criteria: if discolor was found, rated as "x", and if discolor was not found, rated as "○". Also, existence of sulfur element was checked with a X-ray inspection apparatus, and when sulfur element was detected, rated as "Δ" even when discolor was not found.

[Initial Sealability]

Air leakage volume under low surface pressure (100 kPa) was measured. Large leakage volume was rated as "x", and small leakage volume was rated as "○".

[Evaluation of Bolt Axial Load]

In order to evaluate bolt axial load, the stress relaxation test (according to JIS K6263) was performed, and total thickness change of the gasket material was determined. Total thickness change of 60% or less was rated as "○", 60 to 80% was rated as "Δ", and 80% or more was rated as "x".

[Sealability After Immersion Into Distilled Water]

The gasket material was immersed into distilled water at 100° C. for 70 hours in a pressure vessel. Then, its sealability was evaluated according to the scratch drawing test (JIS K6894) on a scale of 5 to 1. The larger value indicates the better result.

(3) The rubber compound described above was vulcanized at 180° C. for 10 minutes in a press, and pressed into 2 mm sheet shape. Its thermal resistance was evaluated as follows.

[Thermal resistance] (Anti Air Heat Aging Resistance Test)

The sample was heated in a Geer oven set at 100° C. for 70 hours, then change of its hardness (instantaneous value measured with a Durometer A) was evaluated. Change of hardness of 4 or less was rated as " ", 5 to 6 was rated as "Δ", and 7 or more was rated as "x".

Example 2

Rubber compound was prepared, gasket material was obtained, and evaluated in the same way as Example 1 except that 1.5 parts by weight of 2-ethyl-4-methylimidazole was added as a crosslinking accelerator.

Example 3

Rubber compound was prepared, gasket material was obtained, and evaluated in the same way as Example 2 except that mixing amount of the carbon black was changed into 10 parts by weight.

Example 4

Rubber compound was prepared, gasket material was obtained, and evaluated in the same way as Example 2 except that mixing amount of the carbon black was changed into 100 parts by weight.

Example 5

Rubber compound was prepared, gasket material was obtained, and evaluated in the same way as Example 2 except that mixing amount of the carboxyl group-modified NBR polymer was changed into 4 parts by weight and 96 parts by weight of a NBR polymer ("N237", manufactured by JSR Corporation) was added.

Example 6

Rubber compound was prepared, gasket material was obtained, and evaluated in the same way as Example 2 except that the carboxyl group-modified NBR polymer ("Nipol NX775", carboxyl group content, 0.083 EPHR, manufactured by Zeon Corporation) was changed into ("Nipol 1072", carboxyl group content, 0.075 EPHR, manufactured by Zeon Corporation).

Example 7

Rubber compound was prepared, gasket material was obtained, and evaluated in the same way as Example 3 except that 10 parts by weight of an inorganic filler ("VM56", manufactured by Hoffmann Mineral GmbH) was added.

Example 8

Rubber compound was prepared, gasket material was obtained, and evaluated in the same way as Example 3 except that 10 parts by weight of wollastonite ("NYAD400", manufactured by NYCO Corporation) was added.

Example 9

Rubber compound was prepared, gasket material was obtained, and evaluated in the same way as Example 2 except that the crosslinking agent ("JER828", manufactured by Japan Epoxy Resin K.K.) was changed into ("YED216D", manufactured by Japan Epoxy Resin K.K.).

Comparative Example 1

Rubber compound was prepared, gasket material was obtained, and evaluated in the same way as Example 1 except that the carboxyl group-modified NBR polymer was changed into a NBR polymer ("N237", manufactured by JSR Corporation).

Comparative Example 2

Rubber compound was prepared, gasket material was obtained, and evaluated in the same way as Example 1 except that the crosslinking agent was changed into 5 parts by weight of a quinoid compound ("Vulnoc GM", manufactured by Ouchi Sinko Chemical Industrial Co., Ltd.).

Comparative Example 3

Rubber compound was prepared, gasket material was obtained, and evaluated in the same way as Example 2 except that mixing amount of the thermally expandable microcapsule foaming agent ("Microsphere F100D, manufactured by Matsumoto Yushi-Seiyaku Co., Ltd.) was changed into 3 parts by weight.

Comparative Example 4

Rubber compound was prepared, gasket material was obtained, and evaluated in the same way as Example 2 except that mixing amount of the thermally expandable microcapsule foaming agent ("Microsphere F100D, manufactured by Matsumoto Yushi-Seiyaku Co., Ltd.) was changed into 12 parts by weight.

Comparative Example 5

Rubber compound was prepared, gasket material was obtained, and evaluated in the same way as Example 2 except that the antiaging agent ("Antigen 3C") was changed into an antiaging agent (2-mercaptobenzimidazole, "Nocrac MB", manufactured by Ouchi Sinko Chemical Industrial Co., Ltd.).

Reference Example 1

Rubber compound was prepared, gasket material was obtained, and evaluated in the same way as Example 1 except that 1.2 parts by weight of sulfur and 2 parts by weight of a crosslinking accelerator (1) (tetramethylthiuram, "Soxinol TS", manufactured by Sumitomo Chemical Co., Ltd.) and 0.5 parts by weight of a crosslinking accelerator (2) (2,2'-dibenzothiazolyl disulfide, "Soxinol DM", manufactured by Sumitomo Chemical Co., Ltd.) were mixed instead of the crosslinking agent.

Reference Example 2

Rubber compound was prepared, gasket material was obtained, and evaluated in the same way as Example 1 except that 5 parts by weight of a quinoid compound ("Vulnoc GM", manufactured by Ouchi Sinko Chemical Industrial Co., Ltd.) and 5 parts by weight of a crosslinking accelerator ("Vulnoc PM", manufactured by Ouchi Sinko Chemical Industrial Co., Ltd.) were mixed instead of the crosslinking agent.

Results in each of Examples, Comparative Examples, and Reference Examples were shown in Table 1.

TABLE 1

(parts by weight)

| | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 | Comparative Example 5 | Reference Example 1 | Reference Example 2 |
|---|---|---|---|---|---|---|---|---|---|---|---|---|---|---|---|---|
| carboxyl group-modified NBR polymer (Nipol NX775) | 100 | 100 | 100 | 100 | 96 | | 100 | 100 | 100 | | 100 | 100 | 100 | 100 | 100 | |
| NBR polymer (N237) | | | | | | | | | | 100 | | | | | | |
| carboxyl group-modified NBR polymer (Nipol 1072) | | | | | | 100 | | | | | | | | | | 100 |
| MT carbon black | 20 | 20 | 10 | 100 | 20 | 20 | 10 | 10 | 20 | 20 | 20 | 20 | 20 | 20 | 20 | 20 |
| inorganic filler (VM56) | | | | | 4 | | 10 | 10 | | | | | | | | |
| wollastonite (NYAD400) | | | | | | | | | | | | | | | | |
| stearic acid | 2 | 2 | 2 | 2 | 2 | 2 | 2 | 2 | 2 | 2 | 2 | 2 | 2 | 2 | 2 | 2 |
| antiaging agent (Antigen 3C) | 3 | 3 | 3 | 3 | 3 | 3 | 3 | 3 | 3 | 3 | 3 | 3 | 3 | | 3 | 3 |
| antiaging agent (Nocrac MB) | | | | | | | | | | | | | | 3 | | |
| foaming agent (Microsphere FOOD) | 7.5 | 7.5 | 7.5 | 7.5 | 7.5 | 7.5 | 7.5 | 7.5 | 7.5 | 7.5 | 7.5 | 3 | 12 | 7.5 | 7.5 | 7.5 |
| plasticizer (DIDA) | 8 | 8 | 8 | 8 | 8 | 8 | 8 | 8 | 8 | 8 | 8 | 8 | 8 | 8 | 8 | 8 |
| crosslinking agent (JER828) | 10 | 10 | 10 | 10 | 10 | 10 | 10 | 10 | | 10 | | 10 | 10 | 10 | 10 | |
| crosslinking agent (YED216D) | | | | | | | | | | | | | | | | |
| crosslinking agent (Vulnoc GM) | | | | | | | | | 10 | | | | | | | |
| sulfur | | | | | | | | | | | 5 | | | | 1.2 | |
| crosslinking accelerator (2-ethyl-4-methylimidazole) | | 1.5 | 1.5 | 1.5 | 1.5 | 1.5 | 1.5 | 1.5 | 1.5 | | | 1.5 | 1.5 | 1.5 | | |
| crosslinking accelerator (TS) | | | | | | | | | | | | | | | 2 | |
| crosslinking accelerator (DM) | | | | | | | | | | | | | | | 0.5 | |
| crosslinking accelerator (Vulnoc PM) | | | | | | | | | | | | | | | | 5 |
| Evaluation | | | | | | | | | | | | | | | | |
| vulcanization rate | Δ | ○ | ○ | ○ | ○ | ○ | ○ | ○ | ○ | × | × | ○ | ○ | ○ | ○ | ○ |
| Expansion ratio | 2.5 | 2.5 | 2.6 | 2.3 | 2.5 | 2.5 | 2.5 | 2.5 | 2.5 | 2.5 | 2.5 | 1.8 | 3.1 | 2.5 | 2.5 | 2.5 |
| metal corrosiveness | ○ | ○ | ○ | ○ | ○ | ○ | ○ | ○ | ○ | ○ | ○ | ○ | ○ | × | × | ○ |
| initial sealability | Δ | ○ | ○ | Δ | ○ | ○ | ○ | ○ | ○ | × | × | × | × | ○ | ○ | ○ |
| evaluation of bolt axial load | 4 | 4 | 4 | 3 | 4 | 4 | 5 | 5 | 4 | 1 | 1 | 4 | 4 | 4 | 4 | 4 |
| sealability after immersion | 4 | 4 | 4 | 4 | 4 | 4 | 4 | 5 | 4 | × | × | 4 | 4 | 4 | 4 | 4 |
| thermal resistance | ○ | ○ | ○ | ○ | ○ | ○ | ○ | ○ | ○ | × | × | ○ | ○ | ○ | ○ | × |

By comparing results of Example 1 and Comparative Example 1 in Table 1, it was found that the foamed rubber layer comprising a carboxyl group-modified NBR polymer of the present invention which was used in Examples 1 to 9 is superior than the foamed rubber layer comprising another NBR polymer in initial sealability and thermal resistance, has less plastic flow (setting) under pressure, and prevents reduction in axial loads of bolts.

As shown by the results of Reference Example 2, even if a quioid-based compound, Vulnoc GM, as a crosslinking agent and Vulnoc PM as a crosslinking accelerator are used in a foamed rubber layer comprising a NBR polymer other than the carboxyl group-modified NBR polymer of the present invention, good thermal resistance cannot be obtained.

By comparing results of Examples 1 and 2, it was indicated that addition of a crosslinking accelerator to the foaming rubber composition of the present invention enhances vulcanization rate, and further prevents reduction in axial loads of bolts.

As shown by the results of Comparative Example 2, it was found that using a quioid-based compound, Vulnoc GM, as a crosslinking agent leads to lower vulcanization rate, worse initial sealability, sealability after immersion, thermal resistance and the like, compared with using an epoxy compound in the present invention.

As shown by the results of Comparative Examples 3 and 4, it was indicated that using a foaming agent of 3 parts by weight and 12 parts by weight precludes suitable expansion ratio for the foamed rubber layer of the present invention, therefore the mixing amount of the foaming agent to cause preferable expansion ratio is about 5 to 10 parts by weight per 100 parts by weight of a carboxyl group-modified NBR polymer of the present invention.

As shown by the results of Comparative Example 5, it was found that using an antiaging agent having sulfur element (Nocrac MB) leads to metal corrosiveness, therefore is not suitable for a gasket material of the present invention used near an electronic part.

As shown by the results of Reference Example 1, it was indicated that using sulfur and other crosslinking accelerators instead of the crosslinking agent leads to metal corrosiveness, therefore is not suitable for a gasket material of the present invention used near an electronic part.

Industrial Applicability

A gasket material of the present invention is capable of preventing corrosion by sulfur element and can be used as a seal part of a product which is easily damaged by corrosion, such as an electronic part, and is capable of forming a tight seal under low surface pressure with a material having low rigidity and inadequate reliability such as to have a blowhole, and is capable of preventing reduction in axial loads of bolts without producing plastic flow (setting) under pressure.

What is claimed is:

1. A gasket material comprising a foamed rubber layer having a closed cell structure is formed, via an adhesive layer, on at least one side of a metal plate, wherein the foamed rubber layer comprises a carboxyl group-modified nitrile rubber, the expansion ratio of the foamed rubber layer is 2.0 to 3.0, and the foamed rubber layer is crosslinked with an epoxy compound, the mixing ratio of said epoxy compound being in the range of 5 to 10 parts by weight per 100 parts by weight of said carboxyl group modified nitrile rubber.

2. The gasket material according to claim 1, wherein the foamed rubber layer further comprises 2-ethyl-4-methylimidazole as a crosslinking accelerator.

3. The gasket material according to claim 1, wherein the expansion ratio of the foamed rubber layer is 2.3 to 2.8.

4. The gasket material according to claim 1 used in a seal part of an electronic part.

5. A gasket material according to claim 1, wherein a rubber composition polymer used in the foamed rubber layer comprises (i) a carboxyl group-modified nitrile rubber alone, or (ii) a mixture of the carboxyl group-modified nitrile rubber and at least one of the rubbers selected from the acrylonitrile-butadiene rubber, a liquid acrylonitrile-butadiene rubber, a hydrogenated acrylonitrile-butadiene rubber, and a styrene-butadiene rubber.

* * * * *